United States Patent
Nettleton et al.

(10) Patent No.: US 7,979,408 B2
(45) Date of Patent: *Jul. 12, 2011

(54) ALLOCATION LOCKS AND THEIR USE

(75) Inventors: David J. Nettleton, Seattle, WA (US);
Steven Bailey, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/752,816

(22) Filed: Apr. 1, 2010

(65) Prior Publication Data

US 2010/0198800 A1 Aug. 5, 2010

Related U.S. Application Data

(63) Continuation of application No. 10/879,664, filed on Jun. 29, 2004, now Pat. No. 7,707,195.

(51) Int. Cl.
*G06F 7/00* (2006.01)
(52) U.S. Cl. ........................................ 707/704; 707/613
(58) Field of Classification Search .................. 707/613, 707/704
See application file for complete search history.

(56) References Cited

U.S. PATENT DOCUMENTS

| 5,544,345 | A | * | 8/1996 | Carpenter et al. | 711/150 |
| 5,551,027 | A | * | 8/1996 | Choy et al. | 1/1 |
| 5,717,919 | A | * | 2/1998 | Kodavalla et al. | 1/1 |
| 5,960,446 | A | * | 9/1999 | Schmuck et al. | 707/610 |
| 6,938,039 | B1 | * | 8/2005 | Bober et al. | 707/704 |
| 7,234,076 | B2 | * | 6/2007 | Daynes et al. | 714/15 |

* cited by examiner

*Primary Examiner* — John R. Cottingham
*Assistant Examiner* — Nirav K Khakhar
(74) *Attorney, Agent, or Firm* — Workman Nydegger

(57) ABSTRACT

Systems and methodologies are provided that employ an allocation lock, which permits only a single transaction to acquire space on a particular page at any one time. The allocation lock of the present invention facilitates operations of concurrent transactions at a subpage level (e.g., a row level), and in conjunction with a heap manager can enforce a set of conditions such that prior to a commit stage of a transaction, a space availability for a particular page can be typically assured (e.g., that transactions operating on various copies of the page do not consume all of storage space on that page), and reorganization of data around the page is mitigated (e.g., that a transaction need not move data around the page for purpose of merging various copies.)

17 Claims, 13 Drawing Sheets

| | Existing Granted Mode on Resource | | | | | |
|---|---|---|---|---|---|---|
| Requested Mode For Resource | | Intent share Lock (IS) | share Lock (S) | Intent Exclusive (IX) | Allocation Lock (A) | Share Intent Exclusive (SIX) | Exclusive Lock (X) |
| | Intent share Lock (IS) | Yes | Yes | Yes | Yes | Yes | No |
| | share Lock (S) | Yes | Yes | No | No | No | No |
| | Intent Exclusive (IX) | Yes | No | Yes | Yes | No | No |
| | Allocation Lock (A) | Yes | No | Yes | No | No | No |
| | share Intent Exclusive (SIX) | Yes | No | No | No | No | No |
| | Exclusive Lock (X) | No | No | No | No | No | No |

ALLOCATION LOCKS AND THEIR USE

CROSS-REFERENCE TO RELATED APPLICATIONS

This application is a continuation of U.S. patent application Ser. No. 10/879,664, filed Jun. 29, 2004, and entitled "ALLOCATION LOCKS AND THEIR USE". The foregoing application is incorporated herein by reference in its entirety.

TECHNICAL FIELD

The present invention relates generally to concurrent transactions in databases, and more particularly to systems and methods that facilitate concurrent transactions at the subpage level when employing a page versioning/copying approach.

BACKGROUND

Background and Relevant Art

Increasing advances in computer technology (e.g., microprocessor speed, memory capacity, data transfer bandwidth, software functionality, and the like) have generally contributed to increased computer application in various industries. Ever more powerful server systems, which are often configured as an array of servers, are often provided to service requests originating from external sources such as the World Wide Web, for example. As local Intranet systems have become more sophisticated thereby requiring servicing of larger network loads and related applications, internal system demands have grown accordingly as well. As such, much business data is stored in databases, under the management of a database management system (DBMS).

For such DBMS systems, a demand for database transaction processing capacity in large installations has been growing significantly. At the same time, a large percentage of overall new database applications have been in a relational database environment. Such relational database can further provide an ideal environment for supporting various forms of queries on the database. For example, a growth in the use of ad hoc unstructured concomitant queries—is a trend that is expected to accelerate in such database environments. This can result in a growing requirement for simultaneously supporting both high volume transaction processing and unstructured queries against the same database. Thus, systems and methodologies that can effectively support both high volume transactions and complex queries, with minimal interference between the two, while sharing copies of data are in demand.

Typically, business entities create and maintain their databases through a high volume of relatively simple transactions, with an essential function of a database engine being able to execute a plurality of such transactions concurrently. Each of such plurality of transactions can be considered a piece of work, which can further consist of a sequence of operations such as, read, write, update, and/or delete, against a database. Such transaction can represent well-understood business operations (e.g., creating a new customer record, noting an account payment or transfer, and the like). Increasingly enterprises are becoming interested in running more ad hoc unstructured queries against their online data. As such, a measure of the correctness of the state of the database or a database integrity becomes increasingly vital.

In general database integrity can refer to the problem of ensuring that two or more concurrently executing transactions do not interfere with each other in such a manner as to produce an incorrect state in the database. An application programmer typically should ensure that each transaction produces a correct state, and that each transaction begins when the database is in a correct state. Such transaction management should generally adhere to the ACID (Atomicity, Consistency, Isolation and Durability) standards. When multiple copies of data pages are created, such standards can be difficult to adhere to.

To facilitate adherence to such standards, conventional procedures employ a number of techniques to assist in maintaining ACID properties—including logging and shadow paging. In general, an approach that maintains multiple copies of database pages offers some advantages in the simplicity of implementation, but also introduces some complexities of its own. For example, during a commit stage of data modifications upon shared resources via shadow paging techniques, additional over head for merging purposes can be required, which can typically impede efficient commit operations for concurrent transactions. Similarly, employing log records can in general add to the complexity of the database management and recovery. At the same time, the more efficiently a database engine supports concurrent transactions, the better an end-user experience can be in terms of speed of operation and reduced database growth.

While applications are interacting with a database system, the database system will typically employ a function referred to a locking to ensure that data the applications are modifying is not modified by another application or process. In general, such locking of the data can prevent users from changing the same data at the same time. If such locking mechanisms do not operate properly, data can become logically incorrect, and future use of the data can produce unexpected results. In addition, multiple transactions trying to use the same data concurrently can give rise to several different types of problems referred to as concurrency problems.

Such problems can cause updates of data by one application to be lost or overwritten by another application. Sometimes data is modified, but not immediately written out in a manner that it can be read by other applications. This can also result in reads of data which should be the same, not being the same.

Therefore, there is a need to overcome the aforementioned deficiencies associated with conventional systems and methodologies related to database operations.

BRIEF SUMMARY

The following presents a simplified summary of the invention in order to provide a basic understanding of one or more aspects of the invention. This summary is not an extensive overview of the invention. It is intended to neither identify key or critical elements of the invention, nor to delineate the scope of the present invention. Rather, the sole purpose of this summary is to present some concepts of the invention in a simplified form as a prelude to the more detailed description that is presented hereinafter.

The present invention provides for systems and methods that employ an allocation lock, which permits only a single transaction to acquire space on a particular page at any one time. The allocation lock of the present invention facilitates operations of concurrent transactions at a subpage level (e.g., a row level), during modifications of a data base by multiple users, wherein the concurrent transactions can operate on various copies of a data page, with each transaction modifying its respective copy of the data page. For example, a transaction $T_1$ requiring a modification of a data page at a sub page level, initially copies a latest committed version of the data page from the data base into its own space. Should the modification by transaction $T_1$ require additional space to be used on the data page, the allocation lock of the present invention locks the page, such that no other transaction that requires additional space on the page is permitted to operate on same page. At the same time, other transactions that require modifications with no additional space on the page can operate thereon.

In a related aspect of the present invention, the allocation lock can provide for efficient merging, thus improving multi user operation and conserving system resources. For example, prior to a commit stage of a transaction (e.g., prior to "hardening" the modifications made by the transaction into a database) the following conditions can be enforced, namely: a space availability for a particular page can be typically assured (e.g., that transactions operating on various copies of the page do not consume all of storage space on that page), and reorganization of data around the page is mitigated (e.g., that a transaction need not move data around the page for purpose of merging various copies.) Such framework enables a commit operation to occur with efficiency and simplicity, thus improving multi user operation and conserving system resources.

According to one aspect of the present invention, a heap manager that determines an availability of space for a data page, interacts with a lock manager that can assign allocation locks. The lock manager can further allow sub page level locks across concurrent transactions, and can be visible to all transactions. By employing the lock manager, and based on a normal concurrency of operation, a determination can be made whether a lock on a particular resource (e.g., a row level locking) can be granted. As such, the lock manager can facilitate compatibility of operations across concurrent transactions, and effectively administer logical considerations during modifications of the database.

In a related aspect, an optimization feature can be introduced in the form of a counter that indicates a difference of data space between a state before modification, and at any stage during operation of a transaction on the data page. Accordingly, when such counter becomes negative, the allocation lock can be released, and alternatively when the counter becomes a positive value, then the allocation lock can be acquired.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIG. 4 illustrates a lock compatibility chart in accordance with an aspect of the present invention.

DETAILED DESCRIPTION

Figure 1:
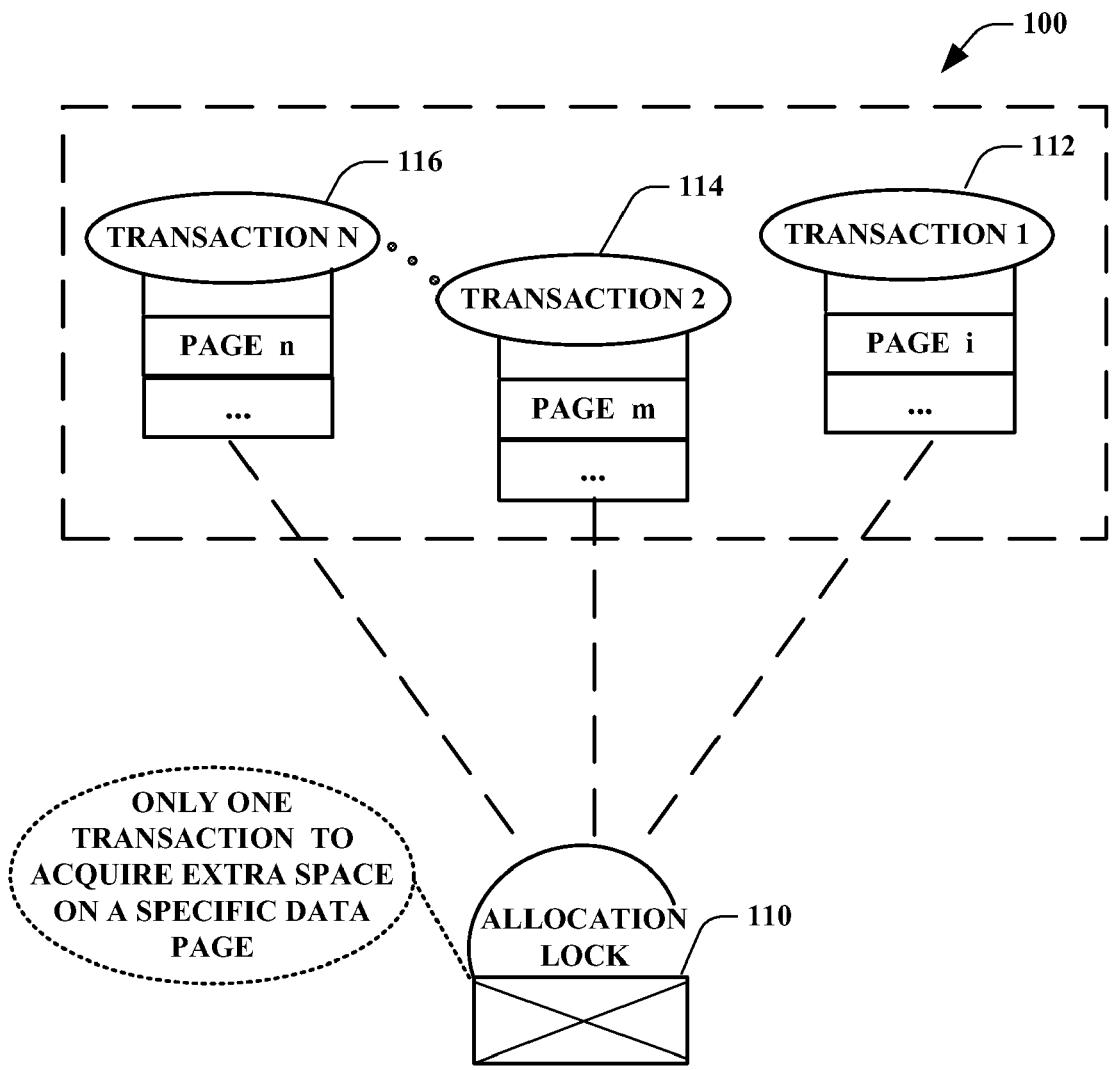
FIG. 1 is a schematic diagram of an allocation lock that operates across a plurality of transactions.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

The present invention provides for systems and methods that employ an allocation lock to facilitate operations of concurrent transactions at a subpage level (e.g., a row level), during modifications of a data base by multiple users. Referring initially to FIG. 1, a multi state transaction environment 100 is illustrated that incorporates an allocation lock 110 operating on a plurality of concurrent transaction 1 thru N (N being an integer). At any given time, any of the multiple transactions 112-116 can desire a modification to a particular data page of the database. Such modifications can include change of data at a particular slot, insertions of data fields, deletion of data field and the like. A transaction can then copy the data page to a reserved space, with each transaction updating, inserting rows or deleting rows in its respective copy of that data page. Should any of the transactions 112-116 require additional space for their respective modifications on a page (s) (i, m, n being an integer) of the database, the allocation lock can be acquired over the page. Such allocation lock can enforce a rule, such that no other transaction requiring additional space on the page is permitted to proceed and modify its respective copy of the page. For example, transaction $T_1$ can require a modification that necessitates obtaining additional space on page "i"; such as updating a row with additional data. If an allocation lock is acquired on the committed version of page"i", other transactions 114-116, can no longer modify such page with an operation that requires additional space thereon. Transactions 114-116 can typically wait for the lock to be released and then attempt to reacquire the allocation lock in accordance with the normal semantics of transactions waiting for appropriate locks. Nonetheless, transactions 114-116 can still operate on page "i" if the respective modification(s) does not require additional space on page "i"—subject to other locking constraints.

Figure 2:
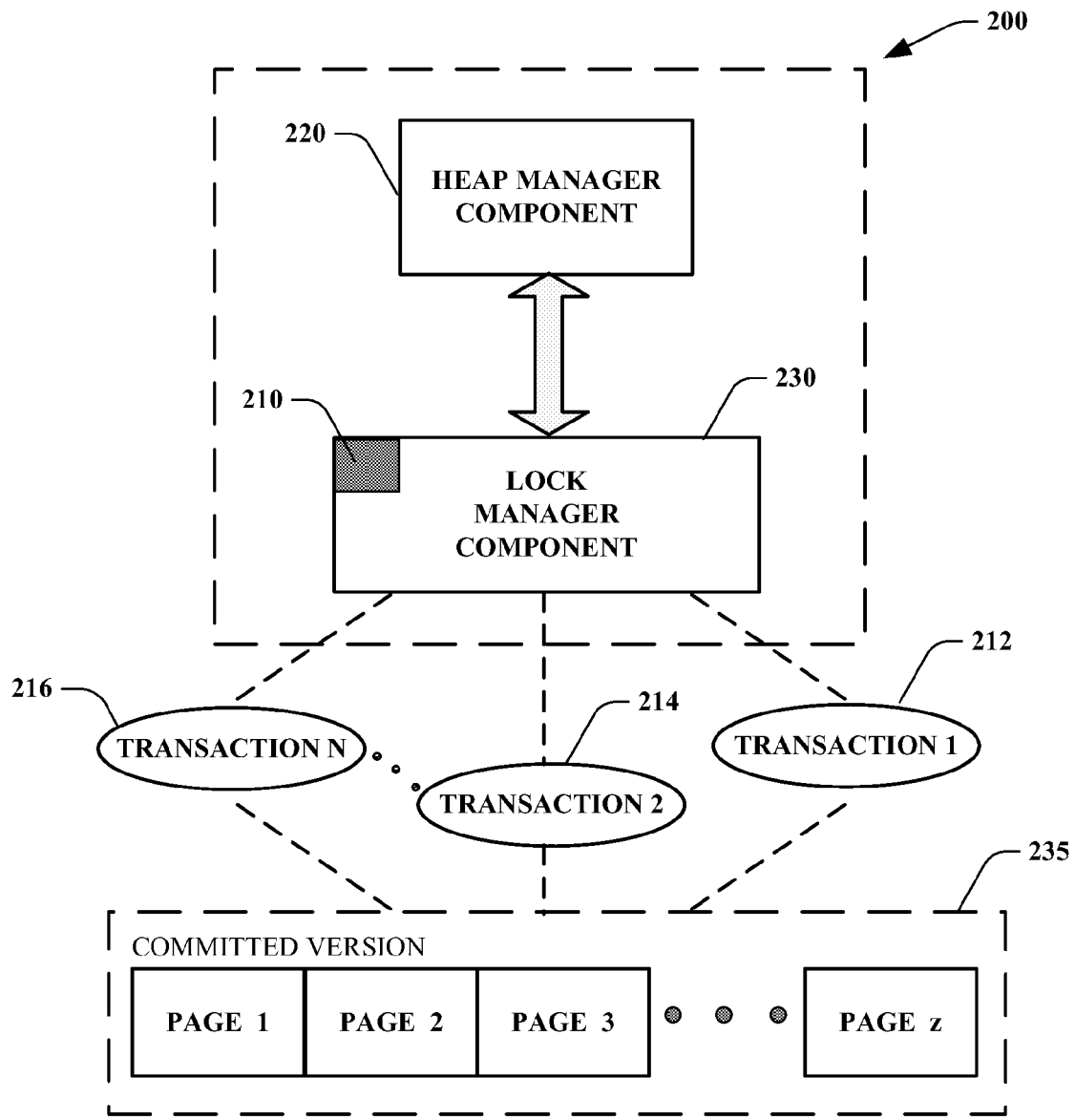
FIG. 2 is a block diagram of a part of a data base engine with a lock manager and a heap manager in accordance with an aspect of the present invention.

FIG. 2 illustrates another aspect for a part of a data base engine 200 that incorporates a lock manger 230 with an allocation lock component 210, and a heap manager component 220. Typically, the part of a data base engine 200 can be a multiple user engine that can enable a plurality of users to simultaneously perform operations in a data base (not shown). Should a transaction require modifying data in a page, initially the page can be copied to a space reserved for that transaction. For example, each of transactions 212-216 (Transaction 1 to Transaction N, with N being an integer) can operate on its respective copy of a data page, which is being copied from a committed version 235 of data pages (N and z being integers), in addition to any data pages created by the transaction. Thereafter, the transaction can operate on such copied page and modify required data.

In such environment with multiple copies of a data page available to various transactions, the lock manager 230 is typically well suited to administer sub-page locking (e.g., row level locking) and can determine whether a lock on a particular resource can be granted. Since many copies of the data page can exist at any given time, the lock manager 230 can typically assure that concurrent transaction can modify information in a same data page, albeit at different rows. For example, lock manager 230 can grant an exclusive lock for a particular row to a transaction, and other transactions would then be restricted to modify such row, even though modifications to other rows can still be permitted. Thus, based on a normal concurrency of operations, the lock manager 230 can grant or deny a lock to a particular resource. For example, if a lock is blocked the request will typically wait. Such request can then be granted if the lock frees up, or it can eventually be denied due to predetermined time limit being reached.

In addition, the lock manager 230 includes a lock allocation component 210 that can permit only a single transaction to acquire additional or extra space on a particular page at any one time. For example, should the modification by transaction $T_1$ require additional space to be used on the data page, the allocation lock of the present invention locks the page, such that no other transaction that requires additional space on the page is permitted to proceed. At the same time, other transactions that require modifications with no additional space on the page can operate thereon. As such, space to be consumed on a page can be restricted to only one transaction at a time.

The heap manager component 220 can determine whether sufficient space is available on a data page, and/or track availability of space on the page, as well as determine whether sufficient space is available to perform some part of or all of a transaction (e.g., insert a new row, update a row with additional data and the like.) Such heap manger component operating in conjunction with the allocation lock component 210, can in general assure enforcement of two conditions prior to a commit stage of a transaction, namely; a space availability for a particular page can be typically assured (e.g., that transactions operating on various copies of the page do not consume all of storage space on that page), and reorganization of data around the page is mitigated (e.g., that a transaction need not move data around the page for purpose of merging various copies.) Such framework enables a commit operation to occur with efficiency and simplicity, thus improving multi user operation and conserving system resources. Thus, in addition to logical considerations for sub page modifications (e.g., whether there is logical permission to perform modification at a particular location), the present invention also considers the physical properties of that page (e.g., whether extra space is consumed on a particular page at time of modification). In a related aspect, extra information can be stored in the allocation lock component (e.g., in the allocation locks themselves), which can be employed to track the additional space that is required by each page. Such can allow an allocation lock to be acquired (or freed) as a transaction performs a series of operations that change the space requirements for each page.

Figure 3:
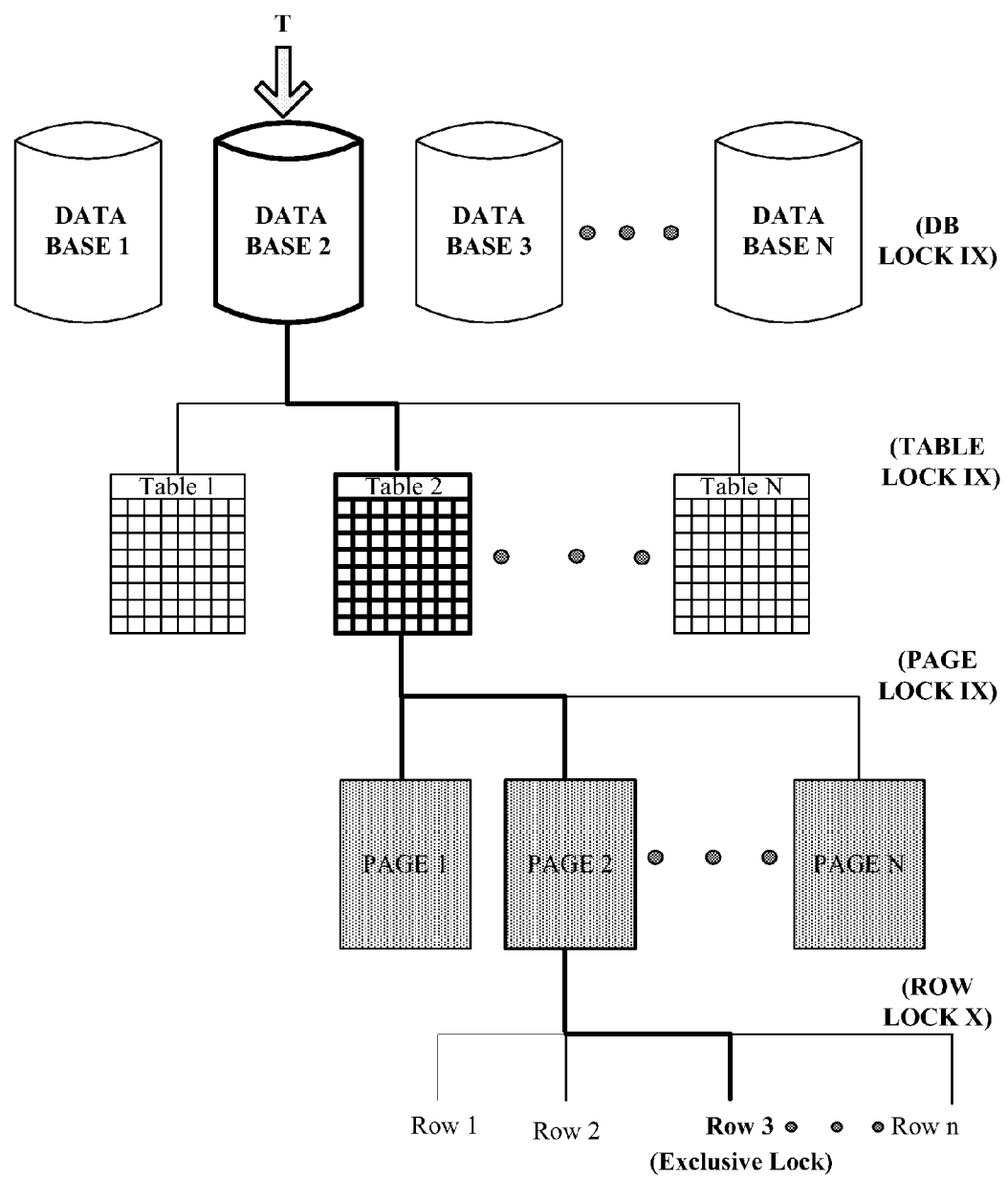
FIG. 3 illustrates an exemplary lock hierarchy administered by the lock manager in accordance with an aspect of the present invention.

FIG. 3 illustrates an exemplary lock hierarchy granted by the lock manager 230 of FIG. 2. As illustrated in the lock granularity, an exclusive lock has been granted for transaction T that requests a modification on row 3 on data page 2 of table 2, of data base 2. As such, a copy of data page 2 can be copied to a reserved space (not shown) of transaction T, and transaction T can then proceed with its modification. Such exclusive lock grant to row 3 can be visible to other transactions, and typically no other transaction can modify such row on its respective copy of data page 2, until T commits its modification and the lock is released. If the modification by transaction T requires additional space to be used on the data page, the allocation lock of the present invention locks the page, such that no other transaction that requires additional space on the page is permitted to proceed. As explained earlier, other transactions that require modifications with no additional space on the page can operate thereon.

FIG. 4 illustrates a lock compatibility table for a plurality of locks that can be employed by the lock manger of the present invention. As transactions perform their operations on their respective copies, request can be made to free or acquire locks on various resources. If a resource is already locked by another transaction, then whether that lock is granted is determined by the compatibility of the lock modes. Table 400 illustrates common lock modes (e.g., exclusive locks (X), share locks (S), and the like) and their compatibility with the allocation lock (A) of the present invention.

Typically, share (S) locks can be used for operations that do not change or update data (read-only operations), such as a SELECT statement. Yet, during a read operation of a data page (e.g., when no modification to a data page is required) there will typically be no requirement to request share locks as a read can be requested from a committed state of the data page. Furthermore if a read operation is required by a transaction that has a copy of any data pages, then the read operation will again not require share locks, as a read can be achieved using the committed pages and/or the transactions version of any pages, (typically the transaction's pages can be used in preference to the committed pages). Typically, if a transaction requires a read of data in the isolation level of repeatable read then S locks can still be required.

Likewise, in general exclusive (X) locks prevent access to a resource by concurrent transactions, and typically no other transactions can read or modify data locked with an exclusive (X) lock. Such exclusive locks can be used for data-modification operations, such as INSERT, UPDATE, or DELETE, and ensure that multiple updates cannot be made to the same resource at the same time.

Similarly, an intent lock can indicate that a database engine requests to acquire a share (S) lock or exclusive (X) lock on some of the resources lower down in the hierarchy. For example, a share intent lock placed at the table level means that a transaction intends on placing share (S) locks on pages or rows within that table. Setting an intent lock at the table level can prevent another transaction from subsequently acquiring an exclusive (X) lock on the table containing that page. Intent locks include intent share (IS), intent exclusive (IX), and share with intent exclusive (SIX).

Likewise, an intent share lock can indicate the intention of a transaction to read some (but not all) resources lower in the hierarchy by placing share (S) locks on those individual resources. An Intent exclusive (IX) lock can indicate the intention of a transaction to modify some (but not all) resources lower in the hierarchy by placing exclusive (X) locks on those individual resources. As such, intent exclusive (IX) can be regarded as a superset of intent share (IS) locks. In addition, a share with intent exclusive (SIX) can indicate the intention of the transaction to read all of the resources lower in the hierarchy and modify some (but not all) resources lower in the hierarchy by placing intent exclusive (IX) locks on those individual resources.

For clarification purposes the following discussion assumes that locks on resources are granted at a row-level. It is to be appreciated that a database query optimizer can select page or table locking, and if a transaction is acquiring a large number of locks, then the locks can be escalated to page and/or table level locks. In addition, allocation locks of the present invention can typically be required for data pages that can exist before the start of a transaction. Put differently, if a transaction creates a new page, then such new page can be created in the transaction's reserved space, and/or remain private to that transaction without visibility to other transactions, until a commit stage. Thus, in general no other transaction can perform an operation on such page, and no allocation lock is required to prevent another transaction consuming space thereupon. It is to be appreciated that decision to make a private page visible is with the heap manager, and if a private page becomes visible an allocation lock can then be required for a modification thereof.

When the allocation locks are employed with fixed length rows, in general an update will not affect the size of a row. Thus, typically allocation locks are not required. For example, an exclusive (X) lock can be acquired on a row, with an intent exclusive lock (IX) on the row's page and higher granularity objects. Similarly, in fixed length row applications, mere deletion of a row in general requires no allocation lock. As such, an exclusive (X) lock can be acquired on a row, with an intent exclusive lock (IX) on the row's page and higher granularity objects.

On the other hand, for an insert operation on an existing page having fixed length rows, additional space can typically always be required. Thus, an insert operation on an existing page with fixed length rows, in general requires an exclusive lock on a row, and an allocation lock on the row's page, as well as an intent exclusive lock on the row's page and higher granularity objects.

In a related aspect of the present invention, wherein a variable length row is employed, the allocation lock for an insert operation, as well as for a delete operation are in general similar to the corresponding condition discussed supra for fixed length rows. Yet, for an update operation, typically an exclusive lock can be acquired on the row. If the update operation is increasing the size of the row (e.g., additional space is consumed, and space is available for update on page), then an allocation lock can be acquired on the row's page, as well as an intent exclusive lock on the row's page and higher granularity objects. If an earlier transaction has already acquired an allocation lock for the page—(since two allocation locks on same page are typically incompatible)—the system can either wait for a release of the earlier lock, or alternatively replace the row with a forwarding pointer and insert the row elsewhere, provided that the size of the forwarding pointer is less than the size of the row. Similar pointers can in general be employed to store location of out-of-row long value data. (Long value data can refer to data that can be stored out of row.)

Figure 5:
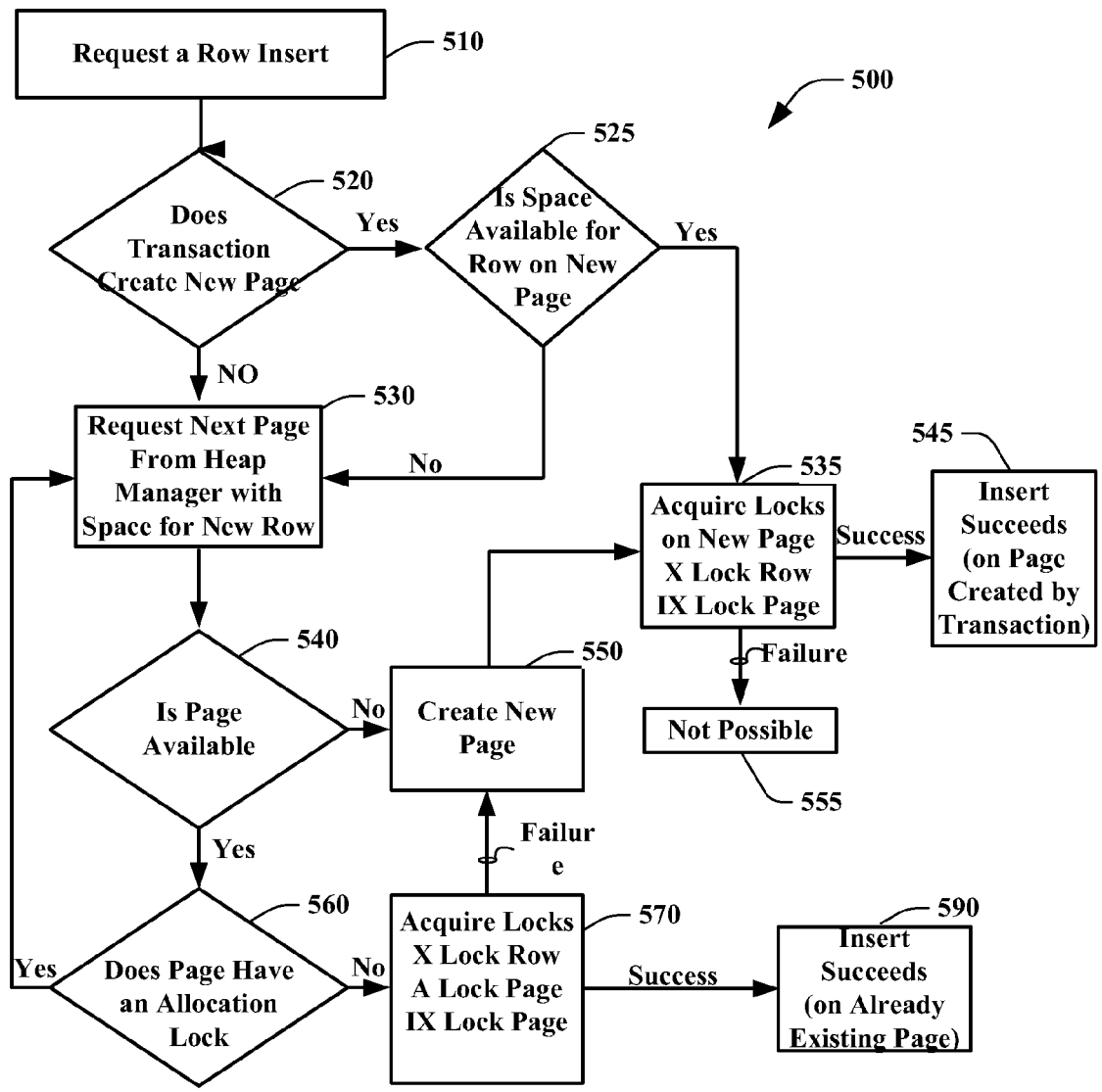
FIG. 5 illustrates an exemplary methodology for inserting a row in accordance with an aspect of the present invention.

As explained earlier, in general if an insert operation has space available on a page created within its transaction scope, then the insert operation can insert data at such available space—instead of placing a lock on an existing committed page. Such can advantageously permit a transaction that is inserting many rows to minimize the shared resources that need to be locked. Alternatively, if the transaction does not create or have access to a new page, then the insert operation can be attempted on a committed page to employ a space available thereon for the insert operation. In determining whether there is space available on any of the existing pages, the heap manager can consider information that indicates whether there are other concurrent transactions that are operating on that page, and any associated space being consumed. For example, FIG. 5 illustrates a methodology according to one aspect of the present invention, for inserting a row as part of a data page modification. Initially, and at 510 a request for insertion of a row is initiated by a transaction. Next, and at 520 it is verified whether the transaction has created a new page. If so, the methodology proceeds to 525 and it is determined whether space is available for row insertion on the new page. Should space be available, and upon grant of proper locks at 535 the insert succeeds on page created by transaction at 545, (if proper locks cannot be acquired by the transaction, the insert fails as illustrated at 555.)

On the other hand, if the transaction has not created a new page, at 530 a request is made from the heap manager for a page with space for new row. If such page is not available, a new page is created at 550, and upon a grant of proper locks at 535, the row can be inserted at 545. If a page is available with space for new row, then a determination is made at 560 whether an allocation lock has already been acquired on such page—for example as a result of another transaction acquiring space on such page. If an allocation lock is already present on such page, the methodology loops back to 530, and another request is made to the heap manager at 530. If no allocation lock is present, and proper locks can be acquired at 570, then the row can be successfully inserted on existing page at 590. Otherwise and if proper locks cannot be acquired, the methodology proceeds to 550, wherein a new page is created, and proper locks are acquired thereupon at 535.

Figure 6:
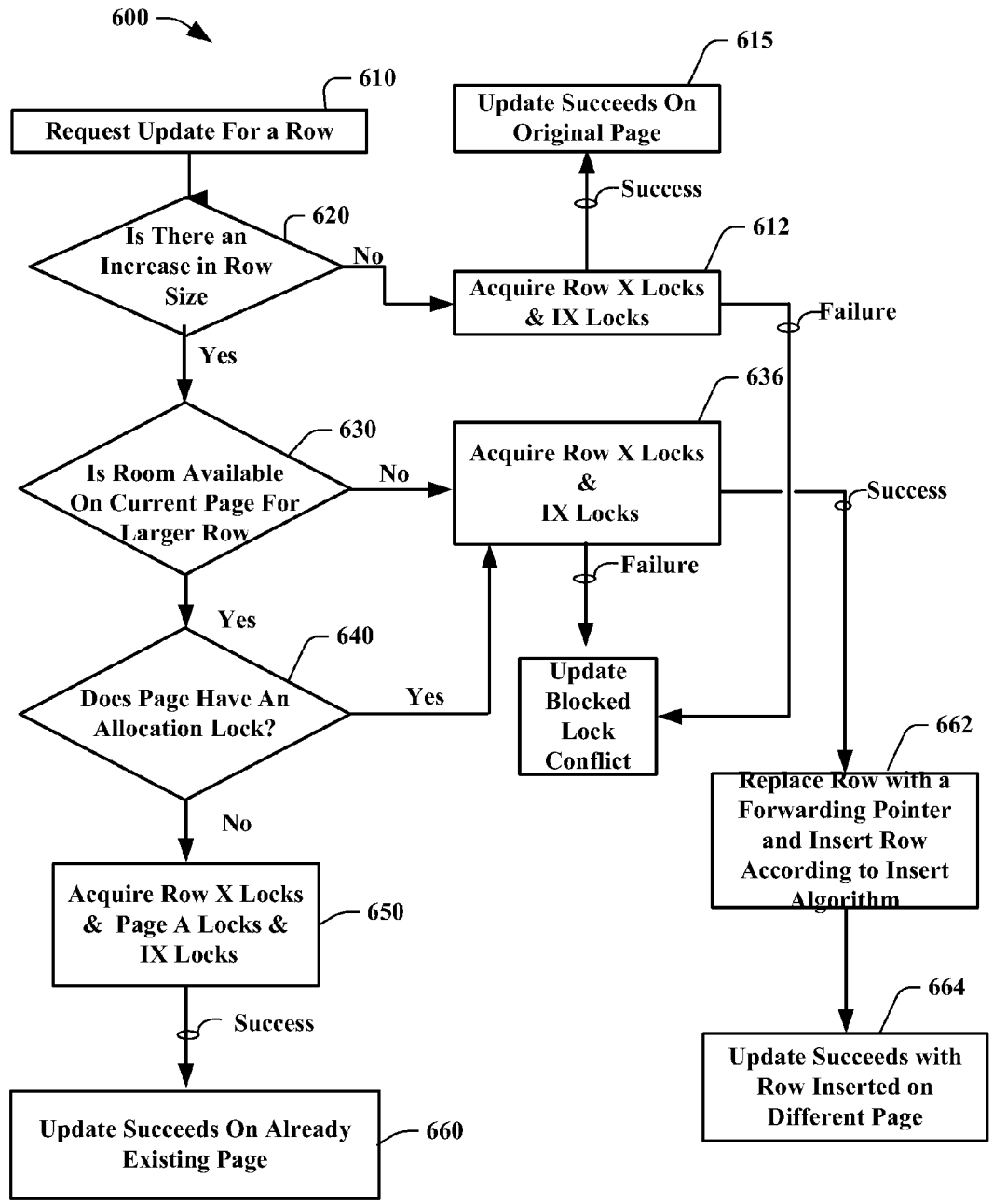
FIG. 6 illustrates another exemplary methodology for updating a row in accordance with an aspect of the present invention.

Referring now to FIG. 6, a methodology for updating a row at 610 and modifying a page in accordance with an aspect of the present invention is illustrated. Typically, if an update operation results in a row that does not require additional space, the operation can always succeed as illustrated at 615, provided appropriate locks can be granted as illustrated at 612. Alternatively, if an update operation grows a row, then the heap manager can determine availability of space initially on the page wherein the row currently exists, at 630. If space is available on a row's current page, then a determination is made at 640 whether an allocation lock is present on the page.

As explained in detail supra such allocation lock permits only a single transaction to acquire space on a particular page at any one time. If an allocation lock is present the methodology of the present invention can employ a forwarding pointer at 662 and insert the row (albeit on a different page at 664) provided that proper locks can be acquired at 636. Such pointer mechanism advantageously enables other database structures that stored the row's initial location to be guided to the new location, without requiring update procedures. It is to be appreciated that such forwarding pointer typically cannot be larger than the size of the row, a condition that can be readily enforced by the database engine. Moreover, such operation can typically succeed, (e.g., assuming proper lock for the update are granted), and the operation can be considered pre-emptive in that the final location of the new row is determined during a normal operation of the update procedure, for example there typically is no requirement for re-arranging of data during a commit phase of a transaction updating a row. Such framework enables a commit operation to occur with efficiency and simplicity, thus improving multi user operation and conserving system resources. Likewise, if an allocation lock is not present on the datapage, and as illustrated at 650 upon grant of proper locks, the update succeeds on the already existing page at 660.

Figure 7:
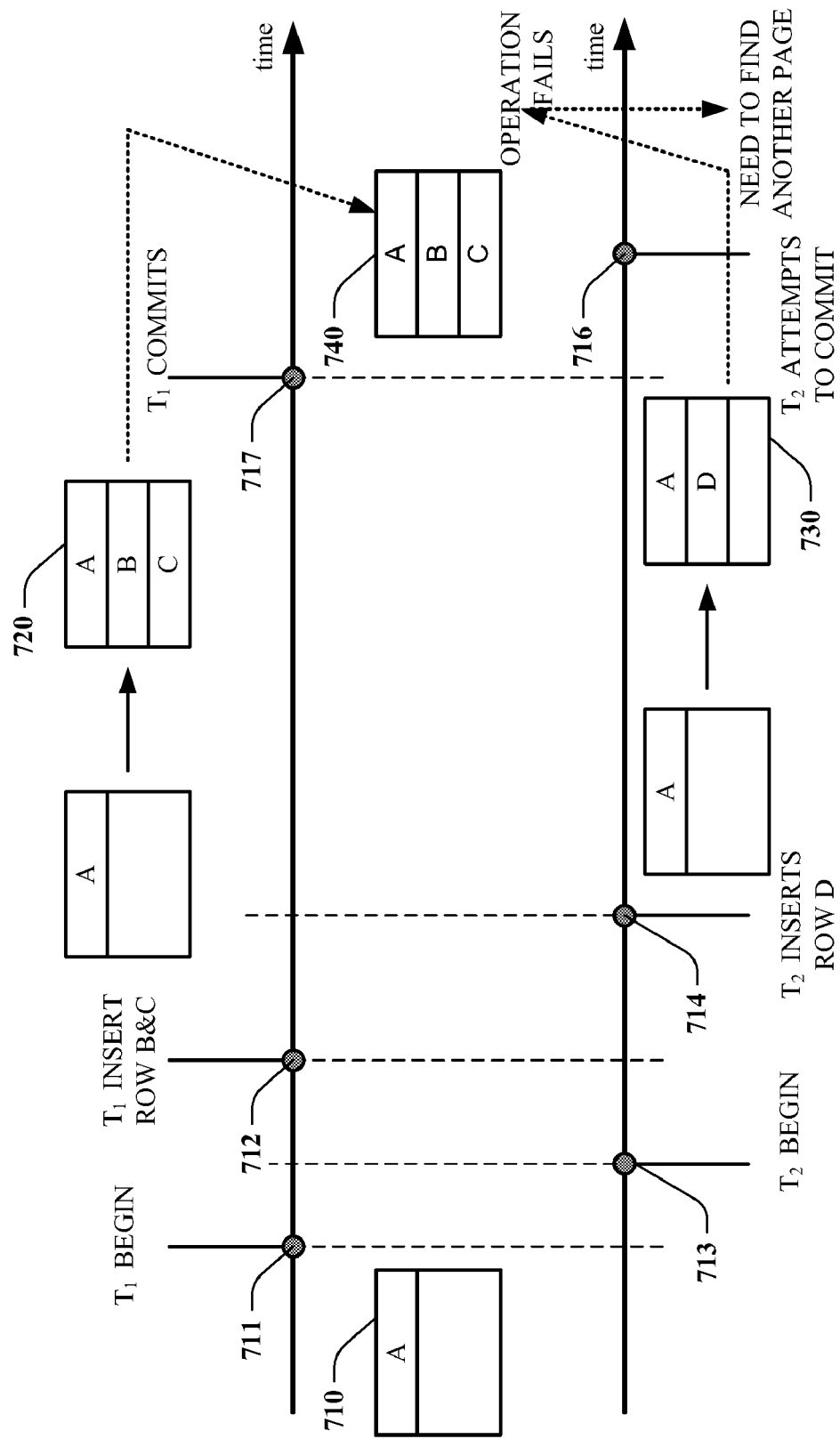
FIGS. 7 & 8 illustrate exemplary inefficiencies in page merging and/or synchronization of concurrent transactions.
Figure 8:
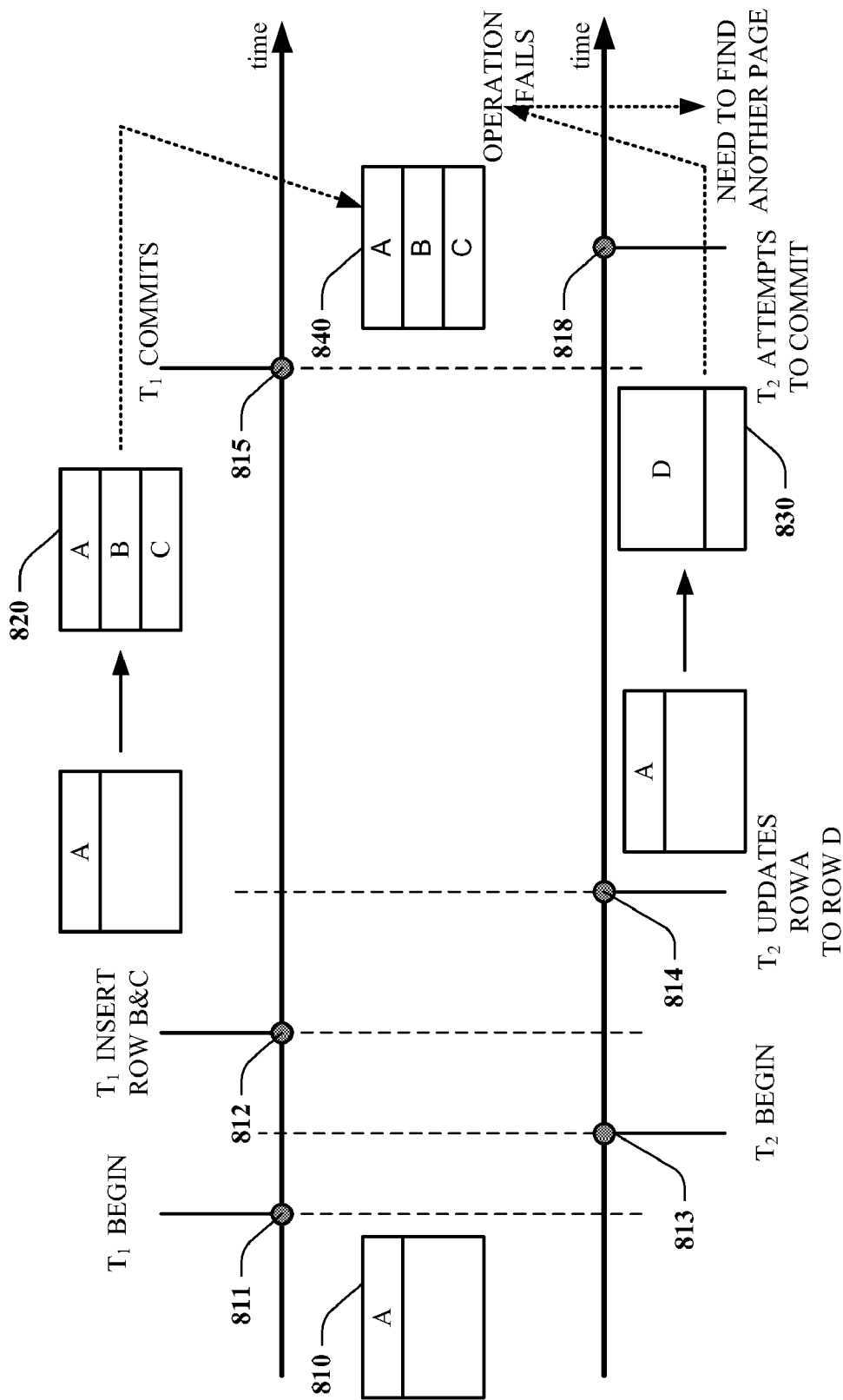

To further illustrate various aspects of the present invention, the following FIGS. 7 & 8 provide examples for two transactions $T_1$ and $T_2$ operating on a time line t, to describe inefficiencies in page merging and/or synchronization of concurrent transactions, which can occur in the absence of an allocation lock of the present invention. For example, inefficiencies in a merging process can arise if a transaction is not able to immediately write its changes to a page, because a previous transaction has consumed all the available space and has committed. Similar inefficiencies can arise when data is required to be displaced and reorganized around a page.

Referring initially to FIG. 7, two concurrent transaction $T_1$ and $T_2$ are illustrated that can operate on same data page 710. The data page 710 initially contains row A. At 711 $T_1$ begins operation on a copy of data page 710 and inserts rows B and C at 712. Such insertions of rows B and C occupy the available space on data page 710 as depicted at 720. Before $T_1$ commits at 717, another transaction $T_2$ starts at 713 and initiates modification of data page 710. Such modification includes insertion of a new row D at 714 to obtain a modified copy of the data page at 730. Next, $T_1$ commits at 717 and a committed version of data page having rows A, B, C that have occupied the page, is updated at 740. If $T_2$ now attempts to commit at 716, the commit operation cannot succeed without first finding another page for positioning of row D. Accordingly, merging and/or synchronization between various copies of data page 710 can typically face difficulties, and result in a waste of system resources, for example adding new pages at all times.

Similar inefficiencies can also occur when an update to a data page occurs, if a row is updated with information requiring additional space. Referring now to FIG. 8, the data page 810 initially contains row A. At 811 $T_1$ begins operation on a copy of data page 810 and inserts rows B and C at 812. Such insertions of rows B and C occupy the available space on data page 810 as depicted at 820. Before $T_1$ commits at 815, another transaction $T_2$ starts at 813 and initiates modification of data page 810. Such modification includes replacing row A with a row D, which consumes twice the space of row A at 814 to obtain a modified copy of the data page at 830. Next, $T_1$ commits at 815 and a committed version of data page having rows A, B, C that have filled the page, is updated at 840. If $T_2$ now attempts to commit at 818, the commit operation cannot succeed without first finding another page for positioning of row D.

By employing the allocation lock in conjunction with the heap manager of the present invention, a set of conditions can be enforced such that prior to a commit stage of a transaction, a space availability for a particular page can be typically assured (e.g., that transactions operating on various copies of the page do not consume all of storage space on that page), and reorganization of data around the page is mitigated (e.g., that a transaction need not move data around the page for purpose of merging various copies.) Such framework enables a commit operation to occur with efficiency and simplicity, thus improving multi user operation and conserving system resources.

Figure 9:
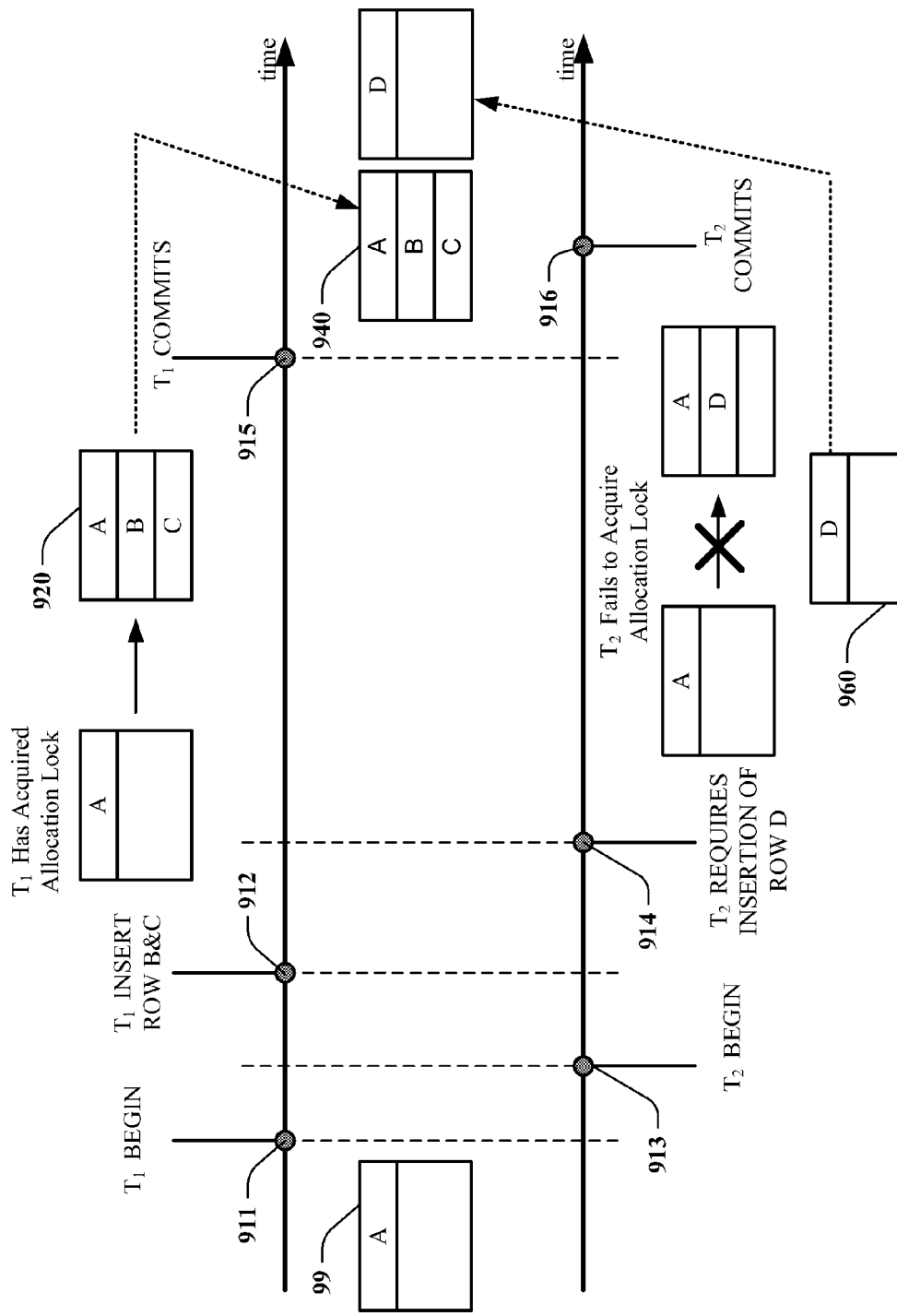
FIGS. 9 & 10 each illustrate application of a methodology according to one aspect of the present invention that can overcome the inefficiencies described with respect to FIG. 7 and FIG. 8 respectively.
Figure 10:
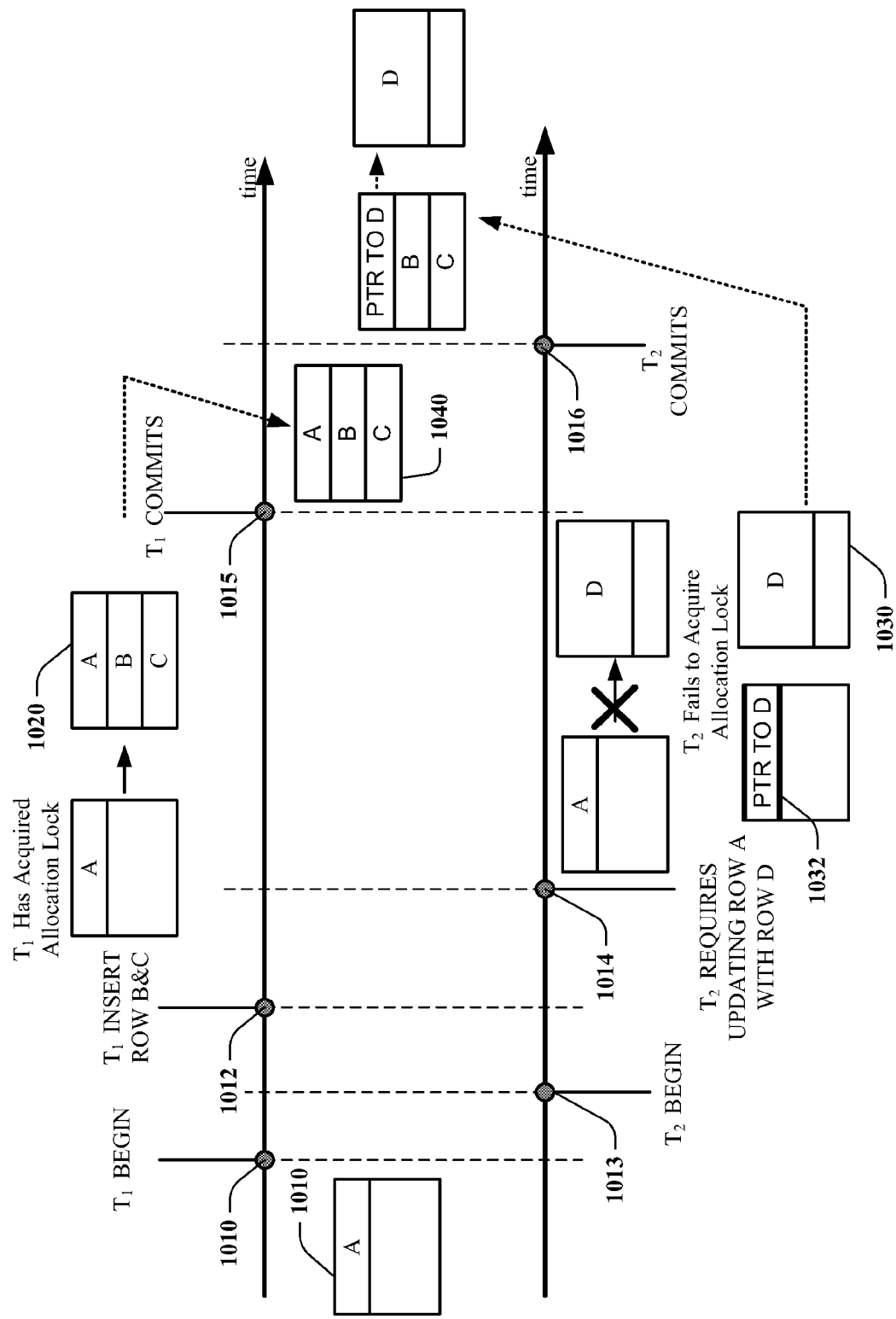

FIG. 9 and FIG. 10 each illustrate application of a methodology according to one aspect of the present invention that can overcome the inefficiencies described with respect to FIG. 7 and FIG. 8 respectively. Referring initially to FIG. 9, two concurrent transaction $T_1$ and $T_2$ are illustrated that can operate on same data page 99. The data page 99 initially contains row A. At 911 $T_1$ begins operation on a copy of data page 99 and acquires an allocation lock to inserts rows B and C at 912. Such insertions of rows B and C occupy the available space on data page 99 as depicted at 920.

The allocation lock can be visible across all transactions, and indicate that no other transaction requiring additional space can operate on the datapage. Accordingly, any other transaction requesting a change that entails using additional space on a copy of page 99 will be blocked from copying and/or modifying it. For example, another transaction $T_2$ starting at 913 and requiring insertion of a new row D at 914 is blocked from copying and modification of the data page, because an allocation lock has already been acquired by $T_1$. Accordingly, as soon as $T_1$ acquires the allocation lock on the page and indicates consumption of extra space on the data page, the lock logic ensures that no other transaction $T_2$ attempts to perform a modification that requires additional space on the data page. Hence, the required insertion by $T_2$ occurs on a new page at 960. Such methodology prevents both transactions $T_1$ and $T_2$ to insert data on the same page, or on some other pages, (not shown), when additional space is required by both, while at the same time employing a qualified approach to introducing new pages, thus avoiding a size explosion in the database. In a related aspect, should $T_1$ roll back its modifications and free up space on the data page, the allocation lock can be removed to indicate the availability of such data page for modification across all transactions. The roll back can also discard associated information stored on space that was to be consumed by the now rolled back transaction (such can also have been stored in each allocation lock), is discarded simultaneously with elimination of the associated locks.

Similarly, FIG. 10 illustrates a methodology that can overcome inefficiencies described with respect to FIG. 8. The data page 1010 initially contains row A. At 1010 $T_1$ begins operation on a copy of data page 1010 and inserts rows B and C at 1012, after acquiring an allocation lock thereupon—(Such insertions of rows B and C can occupy additional space on data page 1010 as depicted at 1020, and hence an allocation lock is being acquired.) The allocation lock can indicate across all transactions that no longer permission exists to operate on datapage 1010 for a transaction that requires additional space. Accordingly, any other transaction requesting a change that entails using additional space on a copy of page 1010 will be blocked from copying and/or modifying it. For example, another transaction $T_2$ starting at 1013 and requiring replacement of row A with row D at 1014 is blocked from copying and modification of the data page, because an allocation lock is already been acquired thereon.

Accordingly, as soon as $T_1$ has acquired an allocation lock on the data page, the logic of the allocation lock prohibits other transactions with operations requesting additional space on the data page. Thus, a new page 1030 is allocated for placement of row D that substitutes row A, or alternatively row D can be placed on an existing data page with sufficient space for such row, and wherein no allocation lock exists (not shown.) A forwarding pointer 1032 can also be provided in place of A, which can for example guide a query to new location of data at row D.

While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described.

In a related aspect of the present invention, various optimizations can be employed to further improve the use of allocation locks within a transaction. Typically, an allocation lock for a page can be requested immediately should a transaction T performs an insert, or extend a row on that page. Nonetheless, if earlier in the transaction, operations have deleted or shrunk rows on the data page, there can exist situations wherein the data page is not grown beyond its original state—even if rows are inserted by transaction T. Accordingly, an optimization feature can be introduced, for example, in the form of a counter that indicates a difference of data space between a state before modification, and at any stage during operation of the transaction. Accordingly, when such counter becomes negative or zero, the allocation lock can be released, and alternatively when the counter becomes a positive value, then the allocation lock can be acquired. By monitoring such counter, the transaction T can acquire and/or release locks based on the operation of the transaction as a whole, and as a net result. Thus, operation efficiency can be increased.

Figure 11:
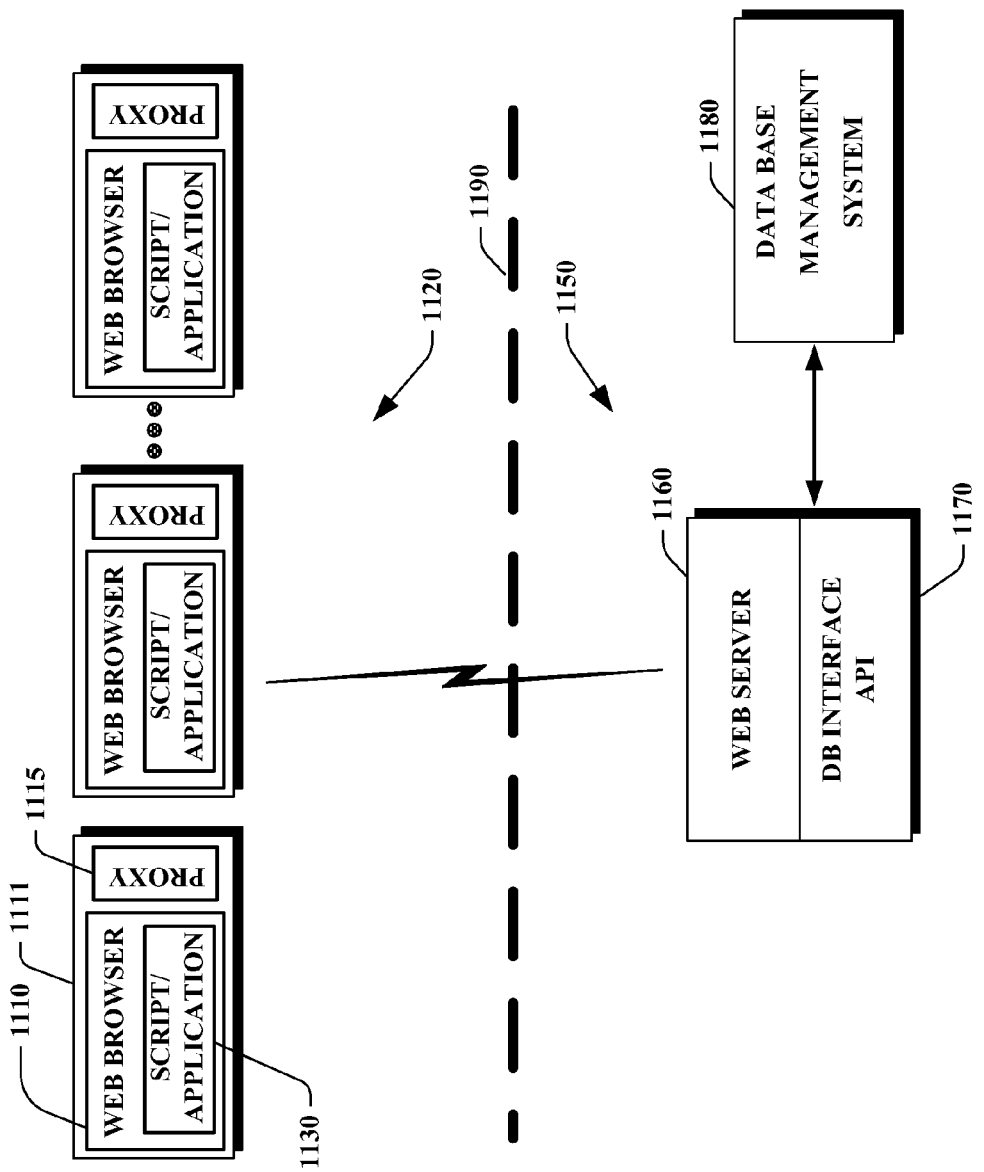
FIG. 11 illustrates a block diagram of a client server network that employs concurrent transactions in accordance with an aspect of the present invention.

FIG. 11 illustrates a plurality of clients that request modification to a data base in accordance with an aspect of the present invention, wherein running on each of the client 1120 can be a client process, for example, a web browser 1110. Likewise, running on the server 1150 can be a corresponding server process, for example, a web server 1160. In addition, embedded in the Web Browser 1110 can be a script or application 1130, and running within the run-time environment 1111 of the client computer 1120, can exist a proxy 1115 for packaging and unpacking data packets formatted. Communicating with the server 1150 is a database management system (DBMS) 1180, which manages access to a database (not shown). The DBMS 1180 and the database (not shown) can be located in the server itself, or can be located remotely on a remote database server (not shown). Running on the Web server 1160 is a database interface Applications Programming Interface (API) 1170, which provides access to the DBMS 1180. The client computer 1120 and the server computer 1150 can communicate with each other through a network 1190. It is to be appreciated that other arrangements are also possible, for example the client computer and the server computer being the same computer. When the client process, e.g., the Web browser 1110, requests data from a database, the script or application 1130 issues a query, which is sent across the network (e.g. internet) 1190 to the server computer 1150, where it is interpreted by the server process, e.g., the Web server 1160. The client's 1120 request to server 1150 can contain multiple commands, and a response from server 1150 can return a plurality of result sets.

In such communication, session, presentation, and application service elements can be provided by Tabular Data Stream (TDS). Since TDS does not require any specific transport provider, it can be implemented over multiple transport protocols and the network 1190. Responses to client commands that are returned can be self-describing, and record oriented; (e.g., the data streams can describe names, types and optional descriptions of rows being returned.)

On the client side 1120 the data can be a Structured Query Language (SQL) command being in a language that the server side 1150 can accept, a SQL command followed by its associated binary data (e.g., the data for a bulk copy command), or an attention signal. When a connection is desired, the client 1120 can send a connection signal to the server. Even though the client 1120 can have more than one connection to the server 1150, each connection path can be established separately and in the same manner.

Once the server 1150 has received the connection signal from the client 1120 it will notify the client that it has either accepted or rejected the connection request. Likewise to send SQL command or batch of SQL commands; then the SQL command (e.g., represented by a Unicode format) can be copied into the data section of a buffer and then sent to the SQL Server side 1150. In addition, various Open Data Base Connectivity (ODBC) routines can cause SQL command to be placed into a client message buffer, or can cause the message buffer to be sent to the server. Once a modification is desired and prior to a commit stage of a transaction, a space availability for a particular page can be typically assured (e.g., that transactions operating on various copies of the page do not consume all of storage space on that page), and reorganization of data around the page can be mitigated (e.g., that a transaction need not move data around the page for purpose of merging various copies.) Such framework enables a commit operation to occur with efficiency and simplicity, thus improving multi user operation and conserving system resources.

Figure 12:
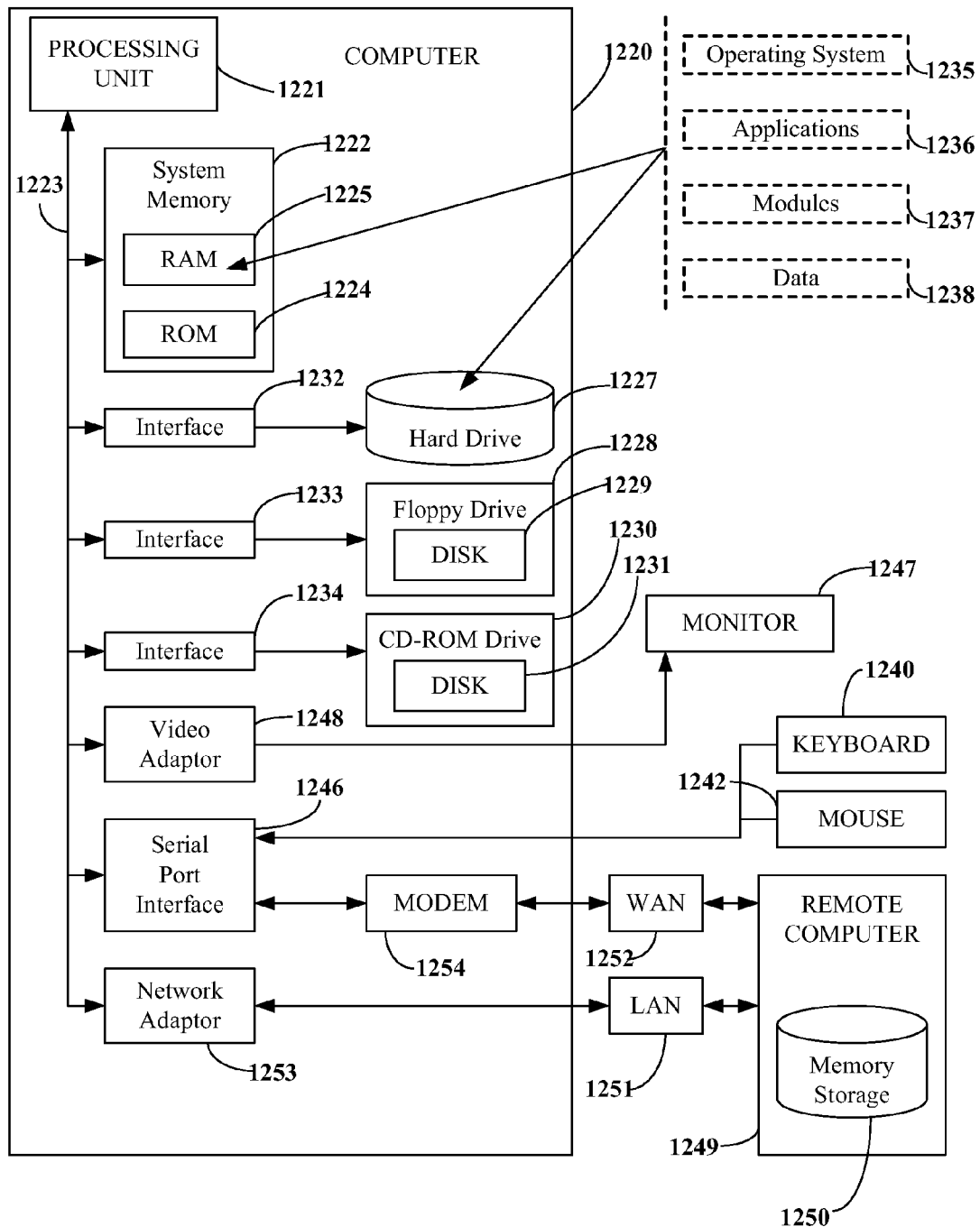
FIG. 12 is a schematic block diagram illustrating a suitable computing environment that can employ various aspects of the present invention.

Referring now to FIG. 12, a brief, general description of a suitable computing environment on the client as well as the server side is illustrated wherein the various aspects of the present invention can be implemented. While the invention has been described above in the general context of computer-executable instructions of a computer program that runs on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary includes a computer 1220, including a processing unit 1221, a system memory 1222, and a system bus 1223 that couples various system components including the system memory to the processing unit 1221. The processing unit 1221 may be any of various commercially available processors. Dual microprocessors and other multi-processor architectures also can be used as the processing unit 1221.

The system bus may be any of several types of bus structure including a memory bus or memory controller, a peripheral bus, and a local bus using any of a variety of commercially available bus architectures. The system memory may include read only memory (ROM) 1224 and random access memory (RAM) 1225. A basic input/output system (BIOS), containing the basic routines that help to transfer information between elements within the computer 1220, such as during start-up, is stored in ROM 1224.

The computer 1220 further includes a hard disk drive 1227, a magnetic disk drive 1228, e.g., to read from or write to a removable disk 1229, and an optical disk drive 1230, e.g., for reading from or writing to a CD-ROM disk 1231 or to read from or write to other optical media. The hard disk drive 1227, magnetic disk drive 1228, and optical disk drive 1230 are connected to the system bus 1223 by a hard disk drive interface 1232, a magnetic disk drive interface 1233, and an optical drive interface 1234, respectively. The drives and their associated computer-readable media provide nonvolatile storage of data, data structures, computer-executable instructions, etc. for the computer 1220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the present invention.

A number of program modules can be stored in the drives and RAM 1225, including an operating system 1235, one or more application programs 1236, other program modules 1237, and program data 1238. The operating system 1235 in the illustrated computer can be substantially any commercially available operating system.

A user can enter commands and information into the computer 1220 through a keyboard 1240 and a pointing device, such as a mouse 1242. Other input devices (not shown) can include a microphone, a joystick, a game pad, a satellite dish, a scanner, or the like. These and other input devices are often connected to the processing unit 1221 through a serial port interface 1246 that is coupled to the system bus, but may be connected by other interfaces, such as a parallel port, a game port or a universal serial bus (USB). A monitor 1247 or other type of display device is also connected to the system bus 1223 via an interface, such as a video adapter 1248. In addition to the monitor, computers typically include other peripheral output devices (not shown), such as speakers and printers.

The computer 1220 can operate in a networked environment using logical connections to one or more remote computers, such as a remote computer 1249. The remote computer 1249 may be a workstation, a server computer, a router, a peer device or other common network node, and typically includes many or all of the elements described relative to the computer 1220, although only a memory storage device 1250 is illustrated in FIG. 12. The logical connections depicted in FIG. 12 may include a local area network (LAN) 1251 and a wide area network (WAN) 1252. Such networking environments are commonplace in offices, enterprise-wide computer networks, Intranets and the Internet.

When employed in a LAN networking environment, the computer 1220 can be connected to the local network 1251 through a network interface or adapter 1253. When utilized in a WAN networking environment, the computer 1220 generally can include a modem 1254, and/or is connected to a communications server on the LAN, and/or has other means for establishing communications over the wide area network 1252, such as the Internet. The modem 1254, which can be internal or external, can be connected to the system bus 1223 via the serial port interface 1246. In a networked environment, program modules depicted relative to the computer 1220, or portions thereof, can be stored in the remote memory storage device. It will be appreciated that the network connections shown are exemplary and other means of establishing a communications link between the computers can be employed.

In accordance with the practices of persons skilled in the art of computer programming, the present invention has been described with reference to acts and symbolic representations of operations that are performed by a computer, such as the computer 1220, unless otherwise indicated. Such acts and operations are sometimes referred to as being computer-executed. It will be appreciated that the acts and symbolically represented operations include the manipulation by the processing unit 1221 of electrical signals representing data bits which causes a resulting transformation or reduction of the electrical signal representation, and the maintenance of data bits at memory locations in the memory system (including the system memory 1222, hard drive 1227, floppy disks 1229, and CD-ROM 1231) to thereby reconfigure or otherwise alter the computer system's operation, as well as other processing of signals. The memory locations wherein such data bits are maintained are physical locations that have particular electrical, magnetic, or optical properties corresponding to the data bits.

Figure 13:
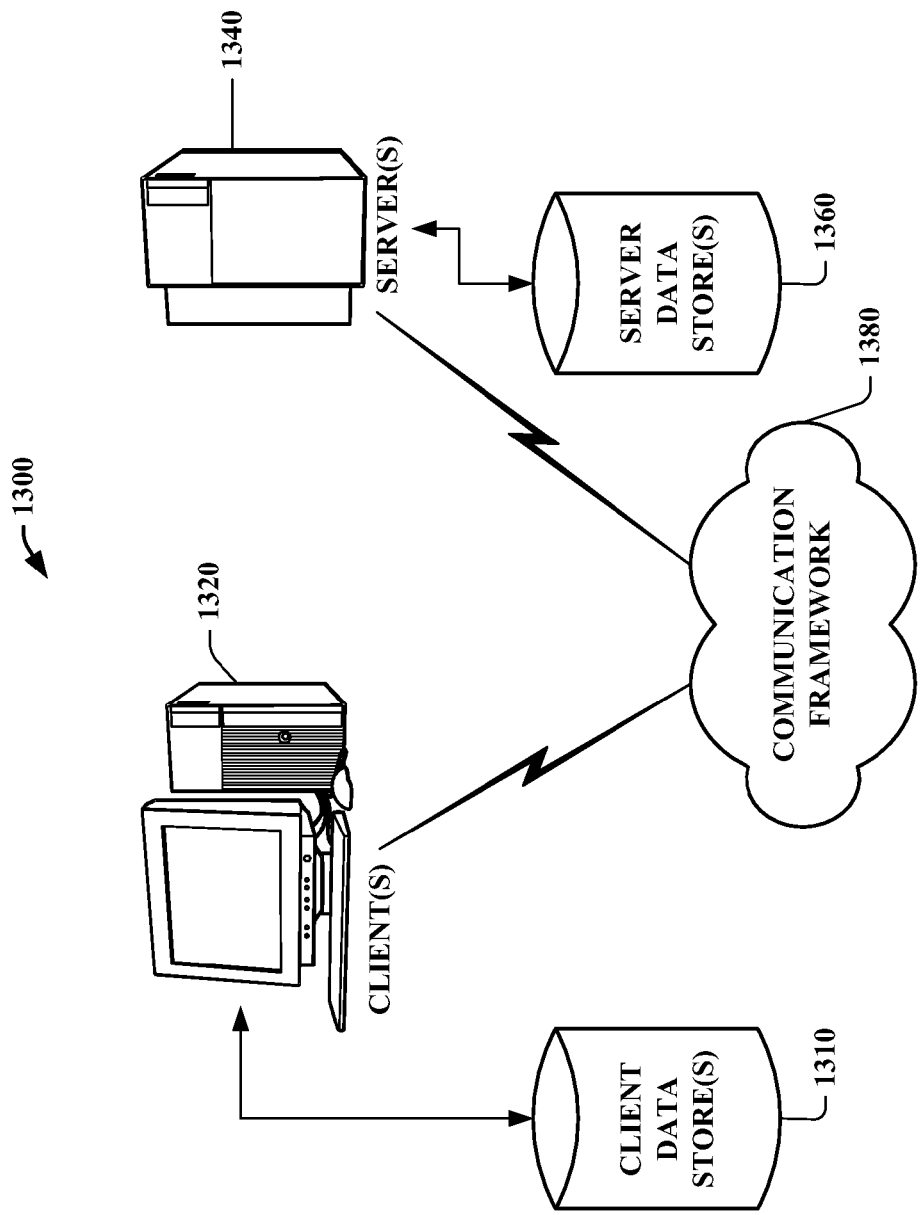
FIG. 13 illustrates a client-server system that can employ a page modification methodology according to one aspect of the present invention.

Referring now to FIG. 13, a client-server system 1300 that employs a data manipulation methodology according to one aspect of the present invention is illustrated. The client(s) 1320 can be hardware and/or software (e.g., threads, processes, computing devices). The system 1300 also includes one or more server(s) 1340. The server(s) 1340 can also be hardware and/or software (e.g., threads, processes, computing devices). For example, such servers 1340 can house threads to perform transformations by employing the present invention. The client 1320 and the server 1340 can communicate, in the form of data packets transmitted according to the present invention, between two or more computer processes. The client/server can also share the same process. As illustrated, the system 1300 includes a communication framework 1380 that can facilitate communications between the client(s) 1320 and the server(s) 1340. The client(s) 1320 is operationally connected to one or more client data store(s) 1310 that can store information local to the client(s) 1320. Moreover, client 1320 can access and update databases 1360 located on a server computer 1340 running a server process. In one aspect of the present invention, the communication frame work 1380 can be the internet, with the client process being a Web browser and the server process being a Web server. As such, a typical client 1320 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 1340 can be university or corporate mainframe computers, or dedicated workstations, and the like.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising."

We claim:

1. A method that facilitates synchronization of concurrent database transactions in a database management system that manages a database having a database data page that provides sub-page row storage space, the database management system further managing a plurality of concurrent database transactions, each of the concurrent database transactions requiring a modification of the database data page, the method comprising:
    creating a copy of the database data page for each of the concurrent database transactions, each of the concurrent database transactions storing its respective copy of the database data page in a separate reserved space to facilitate modifying the database data page;
    assigning an exclusive row level lock on a first row of the database data page to one of the concurrent database transactions when the one of the concurrent database transactions requests to modify the first row, the exclusive lock permits the one of the concurrent database transactions to modify a copy of the first row in its respective copy of the database data page while restricting others of the concurrent database transactions from modifying corresponding copies of the first row in their respective copies of the database data page, but allows the others of the concurrent database transactions to modify other rows;
    assigning an allocation lock on the database data page to the one of the concurrent database transactions when the one of the concurrent database transactions seeks additional space to modify the database data page, the allocation lock permits the one of the concurrent database transactions to acquire additional space on the database data page and to use the additional space in its respective copy of the database data page and allows the others of the concurrent database transactions that do not require additional space on the database data page to effect modifications to their respective copies of the database data page, but prevents the others of the concurrent database transactions from acquiring additional space on the database data page;
    each of the concurrent database transactions modifying its respective copy of the database data page using row level operations to facilitate modifying the database data page;
    tracking space availability for the database data page over the concurrent database transactions, the concurrent database transactions operating on respective copies of the database data page;
    ensuring that the concurrent database transactions do not consume all of storage space on the database data page based in part on the tracked space availability; and
    enforcing a set of conditions on any transaction that operates on the database data page, such that reorganization of data around the database data page at a commit stage of the concurrent database transactions is mitigated while merging of various copies of the database data page during the commit operation.

2. The method of claim 1, further comprising assigning a disparate lock to a resource on the database data page.

3. The method of claim 2, further comprising discarding the locks upon a roll back of a transaction.

4. The method of claim 2, further comprising discarding the locks upon committing a transaction.

5. The method of claim 1, further comprising replacing a row with an inserting pointer that guides a query to a row in a new database data page.

6. The method of claim 5, further comprising inserting the row on the new database data page.

7. The method of claim 1, further comprising assuring availability of space on the database data page prior to a commit stage of a transaction operating on the database data page.

8. The method of claim 7, further comprising mitigating reorganization of data around the database data page at the commit stage of the concurrent database transactions while merging of various copies of the database data page during the commit operation.

9. The method of claim 1, further comprising maintaining a counter to indicate a net result of space change in the database data page during a modification by the concurrent database transactions.

10. The method of claim 9, further comprising acquiring an allocation lock when the counter is positive.

11. The method of claim 1, further comprising acquiring an intent lock at least in one of a table level, a page level and a database level.

12. One or more physical computer readable storage media having stored thereon computer executable instructions that, when executed by a processor, perform a method comprising:
    creating a copy of the database data page for each of the concurrent database transactions, each of the concurrent database transactions storing its respective copy of the database data page in a separate reserved space to facilitate modifying the database data page;
    assigning an exclusive row level lock on a first row of the database data page to one of the concurrent database transactions when the one of the concurrent database transactions requests to modify the first row, the exclusive lock permits the one of the concurrent database transactions to modify a copy of the first row in its respective copy of the database data page while restricting others of the concurrent database transactions from modifying corresponding copies of the first row in their respective copies of the database data page, but allows the others of the concurrent database transactions to modify other rows;

assigning an allocation lock on the database data page to the one of the concurrent database transactions when the one of the concurrent database transactions seeks additional space to modify the database data page, the allocation lock permits the one of the concurrent database transactions to acquire additional space on the database data page and to use the additional space in its respective copy of the database data page and allows the others of the concurrent database transactions that do not require additional space on the database data page to effect modifications to their respective copies of the database data page, but prevents the others of the concurrent database transactions from acquiring additional space on the database data page;

each of the concurrent database transactions modifying its respective copy of the database data page using row level operations to facilitate modifying the database data page;

tracking space availability for the database data page over the concurrent database transactions, the concurrent database transactions operating on respective copies of the database data page;

ensuring that the concurrent database transactions do not consume all of storage space on the database data page based in part on the tracked space availability;

arranging a top-down lock granularity based on logical or physical granularities of objects stored in the database; and using a heap manager component and an allocation lock component to enforce a set of conditions on any transaction that operates on the database data page, such that reorganization of data around the database data page at a commit stage of the concurrent database transactions is mitigated while merging of various copies of the database data page during the commit operation.

13. The one or more computer readable storage media of claim 12, wherein in the one or more computer readable storage media comprise memory.

14. A database management system that manages a database including a database data page, the database data page providing sub-page storage space, the database management system further managing a plurality of concurrent database transactions, each of the concurrent database transactions requiring a modification of the database data page and storing a respective copy of the database data page in a separate reserved space, the database management system comprising:

a processor; and one or more physical computer readable storage media operatively coupled to the processor, the computer-readable storage media having stored thereon computer executable instructions that, when executed by the processor, implement a method comprising:

creating a copy of the database data page for each of the concurrent database transactions, each of the concurrent database transactions storing its respective copy of the database data page in a separate reserved space to facilitate modifying the database data page;

assigning an exclusive row level lock on a first row of the database data page to one of the concurrent database transactions when the one of the concurrent database transactions requests to modify the first row, the exclusive lock permits the one of the concurrent database transactions to modify a copy of the first row in its respective copy of the database data page while restricting others of the concurrent database transactions from modifying corresponding copies of the first row in their respective copies of the database data page, but allows the others of the concurrent database transactions to modify other rows;

assigning an allocation lock on the database data page to the one of the concurrent database transactions when the one of the concurrent database transactions seeks additional space to modify the database data page, the allocation lock permits the one of the concurrent database transactions to acquire additional space on the database data page and to use the additional space in its respective copy of the database data page and allows the others of the concurrent database transactions that do not require additional space on the database data page to effect modifications to their respective copies of the database data page, but prevents the others of the concurrent database transactions from acquiring additional space on the database data page;

each of the concurrent database transactions modifying its respective copy of the database data page using row level operations to facilitate modifying the database data page;

tracking space availability for the database data page over the concurrent database transactions, the concurrent database transactions operating on respective copies of the database data page;

ensuring that the concurrent database transactions do not consume all of storage space on the database data page based in part on the tracked space availability; and wherein a heap manager component and an allocation lock component enforce a set of conditions on any transaction that operates on the database data page, such that reorganization of data around the database data page at a commit stage of the concurrent database transactions is mitigated while merging of various copies of the database data page during the commit operation.

15. The database management system of claim 14, wherein the method further includes a heap manager determining whether sufficient space is available to perform a part of a transaction on the database data page.

16. The database management system of claim 14, wherein a heap manager component and an allocation lock component enforce a set of conditions on any transaction that operates on the database data page, such that storage space availability for the database data page prior to a commit stage of the transaction is assured.

17. The database management system of claim 14, wherein the method further comprises acquiring an intent lock at least in one of a table level, a page level and a database level.

* * * * *